US010101821B2

(12) United States Patent
Yao

(10) Patent No.: US 10,101,821 B2
(45) Date of Patent: Oct. 16, 2018

(54) KEYBOARD APPARATUS HAVING OPERATION SYSTEM AND COMPUTER ASSEMBLY

(71) Applicant: Acooo (Beijing) Limited, Beijing (CN)

(72) Inventor: Zhen Yao, Beijing (CN)

(73) Assignee: ACOOO (BEIJING) LIMITED, Beijing (CN)

( * ) Notice: Subject to any disclaimer, the term of this patent is extended or adjusted under 35 U.S.C. 154(b) by 0 days.

(21) Appl. No.: 15/124,551

(22) PCT Filed: Oct. 17, 2014

(86) PCT No.: PCT/CN2014/088836
§ 371 (c)(1),
(2) Date: Sep. 8, 2016

(87) PCT Pub. No.: WO2015/135320
PCT Pub. Date: Sep. 17, 2015

(65) Prior Publication Data
US 2017/0017308 A1 Jan. 19, 2017

(30) Foreign Application Priority Data

Mar. 13, 2014 (CN) .......................... 2014 1 0091109
Mar. 13, 2014 (CN) .......................... 2014 1 0091133

(51) Int. Cl.
G06F 3/02 (2006.01)
G06F 1/18 (2006.01)

(52) U.S. Cl.
CPC .............. G06F 3/021 (2013.01); G06F 1/182 (2013.01); G06F 3/0219 (2013.01); G06F 3/0227 (2013.01)

(58) Field of Classification Search
None
See application file for complete search history.

(56) References Cited

U.S. PATENT DOCUMENTS

2004/0047344 A1* 3/2004 Chan ....................... G06F 1/16
370/352
2005/0275641 A1* 12/2005 Franz ..................... G09G 5/006
345/204

(Continued)

FOREIGN PATENT DOCUMENTS

CN 201689400 U 12/2010
CN 101382839 A 3/2011

(Continued)

OTHER PUBLICATIONS

"International Application No. PCT/CN2014/088836, International Search Report dated Jan. 16, 2015", w/ English Translation, (Jan. 16, 2015), 5 pgs.

(Continued)

Primary Examiner — Kenneth B Lee, Jr.
(74) Attorney, Agent, or Firm — Schwegman Lundberg & Woessner, P.A.

(57) ABSTRACT

A keyboard apparatus having an operation system, including: a housing; a keyboard assembly having a keyboard portion for performing an input operation outside of the housing and formed in a form of personal computer keyboard; a circuit board provided within the housing; a display output interface connected to the circuit board; and an internal operation system unit connected to the circuit board and adapted to communicate with the keyboard assembly and the display output interface. The keyboard apparatus includes a system switch device for communicating with the display output interface and having: an internal system interface adapted to communicate with the internal operation system unit; an external system interface adapted to communicate with an external operation system unit independent of the keyboard apparatus; and a switch operation component, wherein the internal system interface or the external system interface selectively communicates with the display (Continued)

output interface based on an operation of the switch operation component. The present disclosure further relates to a computer assembly having the above keyboard assembly.

19 Claims, 4 Drawing Sheets

(56) References Cited

U.S. PATENT DOCUMENTS

| | | | |
|---|---|---|---|
| 2007/0094526 A1* | 4/2007 | Nishi | G06F 1/3209 713/310 |
| 2010/0161871 A1* | 6/2010 | Kakish | G06F 3/023 710/316 |
| 2012/0326897 A1 | 12/2012 | Yang | |

FOREIGN PATENT DOCUMENTS

| | | |
|---|---|---|
| CN | 102841632 A | 12/2012 |
| CN | 202600577 U | 12/2012 |
| CN | 103064734 A | 4/2013 |
| CN | 103150209 A | 6/2013 |
| CN | 103294545 A | 9/2013 |
| JP | 08211987 A | 8/1996 |
| JP | 2001228950 A | 8/2001 |
| JP | 2003140806 A | 5/2003 |
| JP | 2014006753 A | 1/2014 |
| KR | 20010059187 A | 7/2001 |
| KR | 20070027859 A | 3/2007 |
| KR | 20070051418 A | 5/2007 |
| KR | 20090066947 A | 6/2009 |
| KR | 20120071295 A | 7/2012 |
| KR | 101294954 B1 | 8/2013 |
| RU | 2371756 C2 | 10/2009 |
| WO | WO-2007094526 A1 | 8/2007 |

OTHER PUBLICATIONS

"International Application No. PCT/CN2014/088836, Written Opinion dated Jan. 16, 2015", (Jan. 16, 2015), 4 pgs.

"Chinese Application No. 201480022425.0, Office Action dated Apr. 28, 2017", w/ English Translation, (Apr. 28, 2017), 13 pgs.

"Japanese Application No. 2016-574317, Office Action dated Jun. 20, 2017", w/ English Translation, (Jun. 20, 2017), 7 pgs.

"Canadian Application Serial No. 2,942,057 Office Action dated Jul. 10, 2017", (Jul. 10, 2017), 5 pgs.

"European Application Serial No. 14885682.6, European Examination Report dated Aug. 30, 2017", (Aug. 30, 2017), 9 pgs.

"Korean Application No. 10-2016-7028212, Office Action dated Jun. 16, 2017", w/ English Translation, (Jun. 16, 2017), 18 pgs.

"Korean Application No. 1020167028212 Office Action dated Nov. 1, 2017", w/English Translation, (Nov. 1, 2017), 8 pgs.

"Korean Application No. 10-2016-7028212, Office Action dated Jan. 9, 2018", w/ English Translation (Jan. 9, 2018), 16 pgs.

"Russian Application Serial No. 2016139360/08 Office Action dated Feb. 1, 2018", w/ English Translation, (Feb. 1, 2018), 17 pgs.

Дорот, Вячеслав Леонидович, " Толковый словарь современной\пкомпьютерой лексики, 3 изд ", БХВ-Петербург, (2004), 607 pgs.

"European Application Serial No. 14885682.6, Communication Pursuant to Article 94(3) dated Apr. 16, 2018", (Apr. 16, 2018), 9 pgs.

"Canadian Application Serial No. 2,942,057 Office Action dated Jun. 19, 2018", (Jun. 19, 2018), 4 pgs.

\* cited by examiner

KEYBOARD APPARATUS HAVING OPERATION SYSTEM AND COMPUTER ASSEMBLY

PRIORITY APPLICATIONS

This application is a U.S. National Stage Filing under 35 U.S.C. 371 from International Application No. PCT/CN2014/088836, filed on 17 Oct. 2014, and published as WO2015/135320 on 17 Sep. 2015, which claims the benefit of priority of Chinese Application No. 201410091109.0, filed on 13 Mar. 2014 and Chinese Application No. 201410091133.4, filed on 13 Mar. 2014; which applications and publication are incorporated herein by reference in their entirety.

BACKGROUND OF THE INVENTION

Field of the Invention

The present invention relates to a field of a computer, more particularly, relates to a keyboard apparatus having an operation system and a computer assembly having the keyboard apparatus.

Description of the Related Art

Recently, a desktop computer is widely used in our life, work, and entertainment or the like, and user group of the computer tends to be divided detailedly. With regard to many users, although the desktop computer may satisfy the demands in our own entertainment and wait, since the desktop computer is designed to conform to composite performances, the following problems have arisen:

1. High cost, even if it is used to handle simply work or character process, a high price computer needs to be purchased, which costs frequently several thousands to ten thousands yuan.

2. High power consumption, a general desktop computer has a power consumption more than 300 W, it will cause a significant electrical energy waste after using the desktop computer for a long time.

3. Complicated operation, with regard to the person not susceptible to the electronic product, the operation of the computer is quite complicated for them.

4. A Large footprint, sophisticated wiring and poor portability. In a scenario necessitating a mobile application, for example, showing presentation or playing a video in a meeting room, handling the document portably, the desktop computer is hard to install and has much space limitation.

5. Poor compatibility between a conventional desktop operation system and a terminal operation system dedicated to a portable terminal or portable communication device.

SUMMARY OF THE INVENTION

The present disclosure is provided so as to overcome at least one of the above problems in the prior art.

In one aspect of the embodiments of the present disclosure, there is provided a keyboard apparatus having an operation system, comprising: a housing; a keyboard assembly having a keyboard portion for performing an input operation outside of the housing and formed in a form of personal computer keyboard; a circuit board provided within the housing; a display output interface connected to the circuit board; and an internal operation system unit connected to the circuit board and adapted to communicate with the keyboard assembly and the display output interface.

Optionally, the keyboard apparatus further comprises a system switch device for communicating with the display output interface and having: an internal system interface adapted to communicate with the internal operation system unit; an external system interface adapted to communicate with an external operation system unit independent of the keyboard apparatus; and a switch operation component, wherein the internal system interface or the external system interface selectively communicates with the display output interface based on an operation of the switch operation component.

According to another aspect of the present invention, there is provided a computer assembly, comprising: a display device, and a keyboard apparatus having an operation system, wherein, the keyboard apparatus comprises: a housing; a keyboard assembly having a keyboard portion for performing an input operation outside of the housing and formed in a form of personal computer keyboard; a circuit board provided within the housing; a display output interface connected to the circuit board; and an internal operation system unit connected to the circuit board and adapted to communicate with the keyboard assembly and the display output interface.

According to a still aspect of the present disclosure, there is provided a computer assembly, comprising: a display device, a PC host installed with the external operation system unit, the keyboard apparatus having an operation system, wherein the keyboard apparatus comprises: a housing; a keyboard assembly having a keyboard portion for performing an input operation outside of the housing and formed in a form of personal computer keyboard; a circuit board provided within the housing; a display output interface connected to the circuit board; an internal operation system unit connected to the circuit board and adapted to communicate with the keyboard assembly and the display output interface; and a system switch device for communicating with the display output interface and having: an internal system interface adapted to communicate with the internal operation system unit; an external system interface adapted to communicate with an external operation system unit independent of the keyboard apparatus; and a switch operation component, wherein the internal system interface or the external system interface selectively communicates with the display output interface based on an operation of the switch operation component.

BRIEF DESCRIPTION OF THE DRAWINGS

In order to describe embodiments of the present disclosure or technical solutions in the prior art more clearly, the drawings necessary for the description of the embodiments or the prior art will be described briefly. It is obvious that the attached drawings described hereinafter are just some embodiments of the present disclosure, and with regard to those of ordinary skill in the art, it is effortless for them to obtain other attached drawings according to those attached drawings.

DETAILED DESCRIPTION OF PREFERRED EMBODIMENTS OF THE INVENTION

The technical solutions in embodiments of the present disclosure will be described hereinafter in detail and completely with reference to the attached drawings in the embodiment of the present disclosure. It is obvious, however, that the described embodiments are just part of the embodiments of the present disclosure, rather than the entire embodiments. Based on the embodiments of the present disclosure, other embodiments obtained by the person skilled in the art without inventive effort will fall within the protection scope of the present disclosure.

According to a general concept of the present invention, there is provided a keyboard apparatus having an operation system, comprising: a housing; a keyboard assembly having a keyboard portion for performing an input operation outside of the housing and formed in a form of personal computer keyboard; a circuit board provided within the housing; a display output interface connected to the circuit board; and an internal operation system unit connected to the circuit board and adapted to communicate with the keyboard assembly and the display output interface.

A keyboard apparatus having an operation system will be described in detail with reference to FIGS. 1-4.

Figure 1:
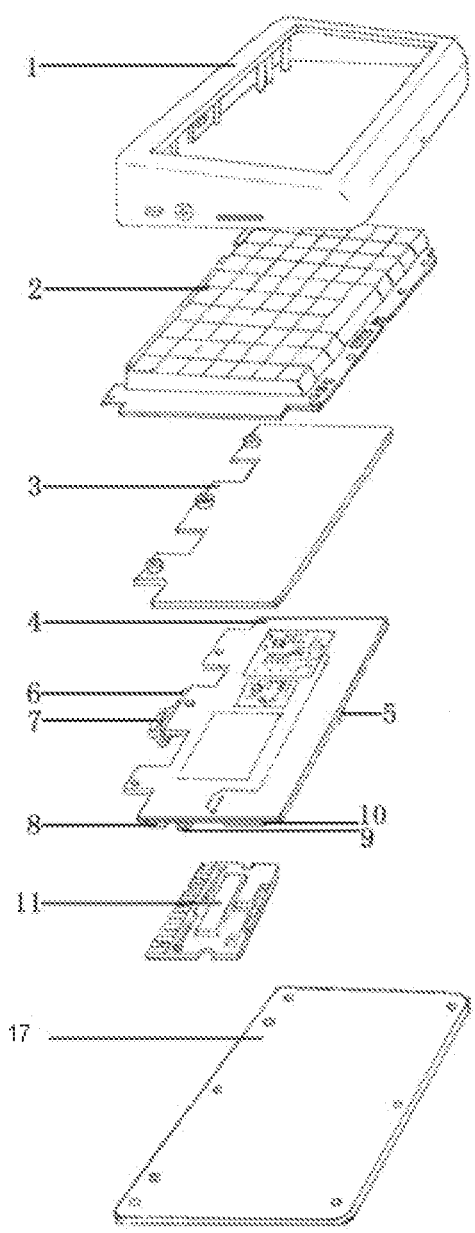
FIG. 1 is an exploded perspective view illustrating a configuration of a keyboard apparatus having an operation system according to an exemplary embodiment of the present disclosure.

FIG. 1 is an exploded perspective view illustrating a configuration of a keyboard apparatus having an operation system according to an exemplary embodiment of the present disclosure. As shown in FIG. 1, the keyboard apparatus comprises a housing 1 at least partially covering a keyboard assembly 2 and further comprises a circuit board 4 and input interfaces and/or output interfaces.

The keyboard assembly 2 may be a common keyboard unit frequently used by a PC host. In other words, the keyboard assembly 2 is formed in a form of personal computer keyboard.

The circuit board 4 is connected to an internal operation system unit (i.e. a processing unit) 11, and the internal operation system unit 11 may be a single processing unit, or a composite processor assembly integrated with CPU, GPU, even a memory, a flash memory, a wireless module, a Bluetooth module, an audio module and the like. It should be understood by the person skilled in the art that with the development of the technology in the art, the functions performed by the internal operation system unit 11 and the integrated assemblies in the internal operation system unit 11 will be much wider. The internal operation system unit 11 is mounted on the circuit board 4 in solid-joint or plug-in manner.

The internal operation system unit 11 is connected to the keyboard assembly 2 and the input interfaces and/or the output interfaces, so as to process an information input from the keyboard assembly 2, and also to receive and/or process information from the input interfaces, and/or output information to the output interfaces.

The input interfaces may be a microphone input interface 5, a control input interface 6, and a power source input interface 8 for supplying power to electro-components within the keyboard apparatus. As a common design in the computer field, the control input interface 6 may be an USB interface interfacing with an input device, such as a mouse and/or a touch panel, while the power source input interface 8 may also be an USB interface using an USB cable to supply power.

In another aspect, the output interface is one or more of a display output interface 7, an audio output interface 9. The display output interface 7 may be one or more of a VGA interface, a DVI interface, a HDMI interface and a DP interface.

The keyboard apparatus may have a memory unit, or may have an external storage device read-write unit 10. In the present embodiment, the external storage device read-write unit 10 is a SD card slot.

The above keyboard apparatus may further comprise a wireless antenna 13 (see FIG. 2), which is connected to the circuit board and communicates with the internal operation system unit.

In order to be acted as a terminal, the keyboard apparatus is preset with a terminal operation system, or may access to a terminal operation system preset in an external storage device.

In the present embodiment, the operation system is Android operation system. It should be understood by the person skilled in the art that the present disclosure is not limited to set forth above, and the operation system may also be IOS operation system, Linux operation system or Tizen operation system, or other operation system.

According to actual demands, the keyboard apparatus comprises one or more of an Universal Serial Bus (USB) transmission interface and an USB unit, a Bluetooth transmission interface and a Bluetooth unit, a High-Definition Multimedia Interface (HDMI) transmission interface and a HDMI unit, a wireless transmission device, a communication device, an external storage device read-write unit.

According to actual demands, the keyboard apparatus further comprises one or more of a camera, a displacement sensor, a temperature sensor, a gyroscope, an indicator, a pressure sensor, a fingerprint identification device.

The keyboard apparatus may further comprise electrical isolation plate 3, which is at least partially located within the housing 1 so as to provide electrical isolation for all or part of the constituting components or units of the keyboard apparatus.

Further, as shown in FIG. 1, the housing 1 is opposite to a bottom plate 17, and the housing 1 together with the bottom plate 17 constitutes an overall appearance of a smart input device.

Thus, the present disclosure provides a keyboard apparatus, which is integrated with processing functions, and may interact data with other external devices so as to solve the problems, such as high price, high power consumption, complicated operation, poor portability, existing in the recent desktop computer, and ease the use.

The keyboard apparatus according to the present disclosure also brings about the benefit, such as low power consumption and environment-friendly product.

Since the keyboard apparatus according to the present disclosure provides plenty of input/output interfaces and other function units such that it has a good expansibility, which causes the keyboard apparatus to be easily and conveniently used in various applications, such as basic office, entertainment, internet surf, education and training.

Figure 2:
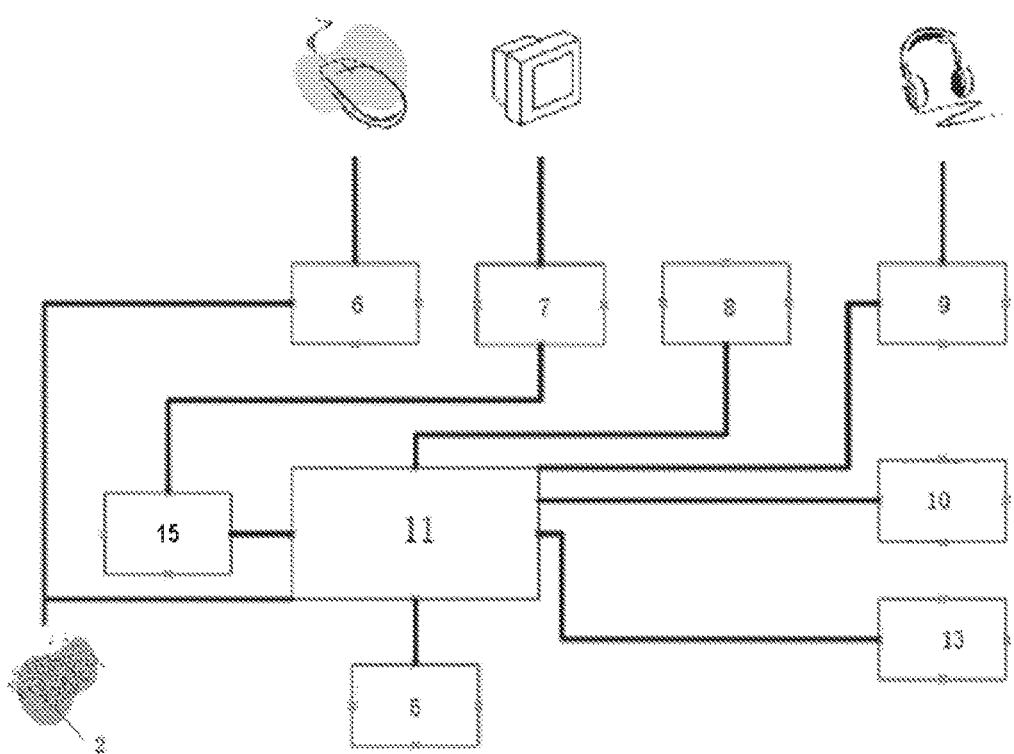
FIG. 2 is a schematic view illustrating an operation mode of the keyboard apparatus having an operation system in FIG. 1.

A detailed operation mode of the keyboard apparatus according to the present disclosure will be explained exemplarily with reference to FIG. 2.

Step I, starting the keyboard apparatus. The start can be achieved by plugging in the keyboard apparatus and pressing a start key on the keyboard apparatus and the like.

Step II, detecting an operation system of the internal operation system unit 11 of the keyboard apparatus and normally starting the internal operation system. As above mentioned, the internal operation system may be built in the memory device, and also may be provided in the external storage device. The internal operation system may be Android operation system, IOS operation system, or Windows operation system or Tizen operation system, or other operation system. The internal operation system unit 11 may process the following steps:

1. the internal operation system unit 11 outputs a display signal and receives an input signal via a HDMI-VGA signal converter 15;
2. the internal operation system unit 11 outputs a display signal to the display output interface 7;
3. the internal operation system unit 11 receives inputs from the control input interface 6 and the keyboard assembly 2;
4. the internal operation system unit 11 outputs an audio signal to the audio output interface 9;
5. the internal operation system unit 11 receives an audio signal from the microphone input interface 5;
6. the internal operation system unit 11 reads the external storage device read-write unit 10;
7. the internal operation system unit 11 amplifies a wireless signal from the internal operation system unit 11 through the wireless antenna 13.

It should be understood that various functions in step II are not necessary to be achieved in the above order, such as the audio signal from the microphone input interface 5 can be received first and the display signal is then output to the display output interface 7. The order can be varied based on the actual application and is not specifically limited.

A computer assembly may be formed by combining the above keyboard apparatus with a display device. The display device is connected with the display output interface in the keyboard apparatus.

Figure 3:
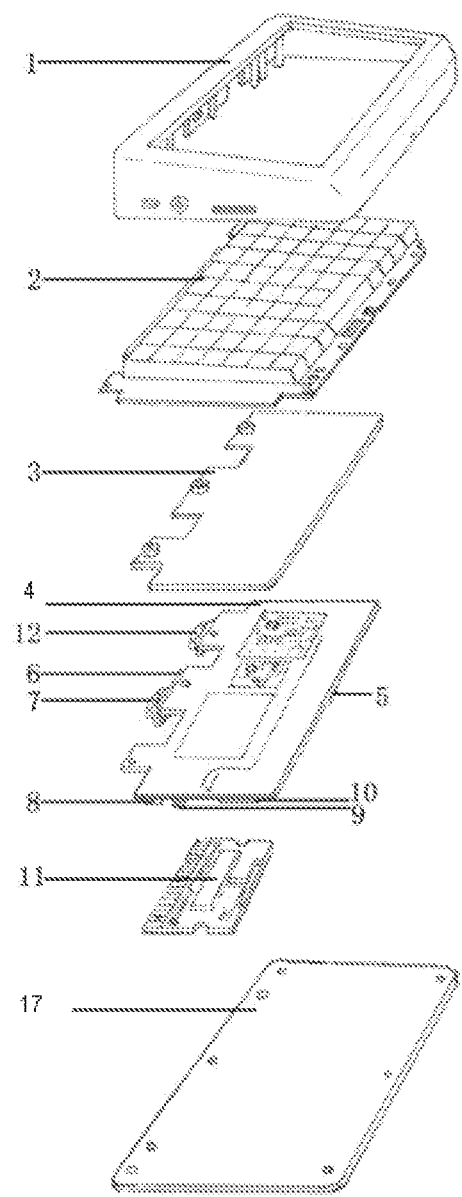
FIG. 3 is an exploded perspective view illustrating a configuration of a keyboard apparatus having an operation system according to another exemplary embodiment of the present disclosure.
Figure 4:
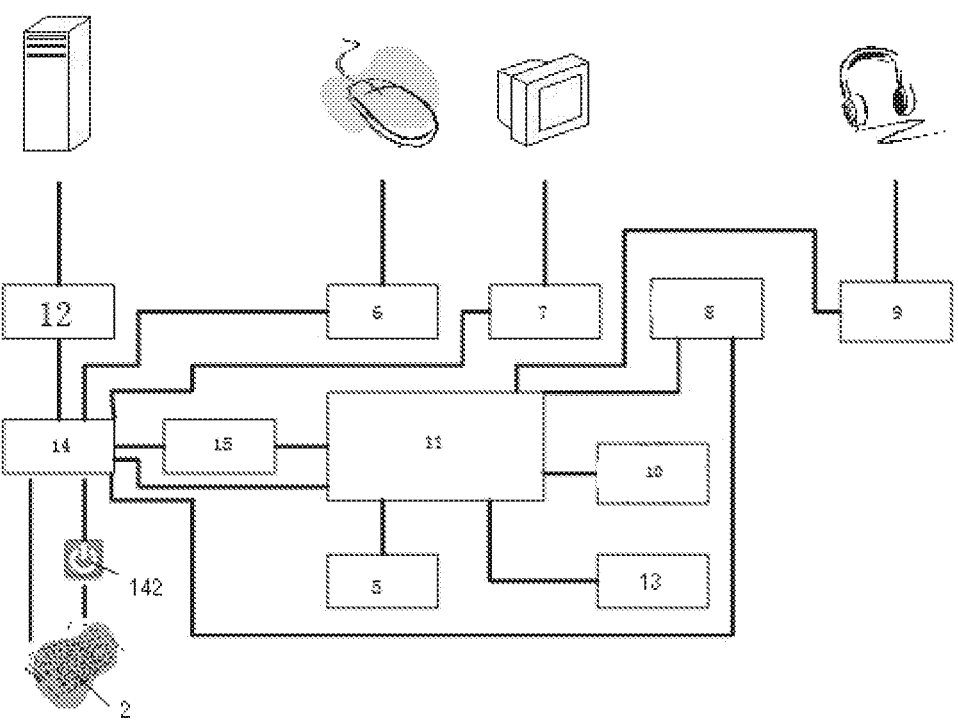
FIG. 4 is a schematic view illustrating an operation mode of the keyboard apparatus having an operation system in FIG. 3.

FIG. 3 is an exploded perspective view illustrating a configuration of a keyboard apparatus having an operation system according to another exemplary embodiment of the present disclosure; and FIG. 4 is a schematic view illustrating an operation mode of the keyboard apparatus having an operation system in FIG. 3. The keyboard apparatus in FIGS. 3 and 4 differs from that in FIGS. 1 and 2 mainly in that it is provided with a system switch device 14 and an external system interface 12. In the present disclosure, the same or like reference numeral indicates the same or like elements. In other words, the description with respect to FIGS. 1 and 2 is also adapted to the keyboard apparatus shown in FIGS. 3 and 4.

The keyboard apparatus in FIG. 3 is provided with the system switch device 14 (see FIG. 4) which communicates with the display output interface 7 and has an internal system interface (not explicitly shown in the drawings, corresponding to an interface between the system switch device 14 and the internal operation system unit 11) adapted to communicate with the internal operation system unit; an external system interface 12 (see FIG. 3 and FIG. 4) adapted to communicate with an external operation system unit 16 independent of the keyboard apparatus; and a switch operation component 142, wherein the internal system interface or the external system interface 12 selectively communicates with the display output interface 7 based on an operation of the switch operation component 142.

The external system interface 12 is an interface on the circuit board 4 and is used to input a video signal from the external operation system unit 16, such as a PC host, and is connected to a control interface of the external operation system unit 16, such as a VGA interface and an USB interface. When the keyboard apparatus is used as a keyboard of the external operation system unit 16, such as the PC host, the keyboard apparatus receives an input of the user, and transmits data to the external operation system unit 16 (such as the PC host) via the external system interface 12, and receives a video signal input from the external operation system unit 16 (such as the PC host) via the external system interface 12.

When the internal system interface is connected to and thus communicates with the display output interface 7 based on an operation of the switch operation component 142, the internal operation system unit 11 runs and communicates with the display output interface 7 via the internal system interface, and the keyboard apparatus shields or prevents a video signal from the external operation system unit 16 (such as the PC host) from being transmitted to the display output interface 7, and an input device of the internal operation system unit 11 comprises at least the keyboard portion, and the keyboard apparatus may also shield or prevent an audio signal from the external operation system unit 16 (such as the PC host) from being transmitted to the audio output interface 9. When the internal system interface is connected to and thus communicates with the display output interface 7 based on an operation of the switch operation component 142, the keyboard apparatus is in a terminal operation mode, that's to say, the keyboard apparatus is worked as a host directly, and may transmit signal to external devices (such as a display device, or a headset) via the output interfaces (such as the display output interface 7 and the audio output interface 9).

In the terminal operation mode, although the keyboard apparatus shields or prevents a video signal from the external operation system unit 16 from being transmitted to the display output interface 7, the keyboard apparatus may still allow data to be exchanged between the internal operation system unit 11 and the external operation system unit 16. The keyboard apparatus may not shield or prevent the external operation system unit 16 (such as the PC host) from transmitting signals to the external devices, and may share the external devices with the external operation system unit 16.

In an embodiment, the real-time share to the display device may be realized between the internal operation system unit 11 and the external operation system unit 16. To be specific, the internal operation system unit 11 maybe adapted to receive a video signal from the external operation system unit 16, and sends the received video signal from the external operation system unit 16 and its own video signal to a display unit 18 via the display output interface 7 so as to display them in sub-domains of the display unit 18.

When the external system interface 12 is connected to and thus communicates with the display output interface 7 based on an operation of the switch operation component 142, and the keyboard apparatus shields or prevents a video signal from the internal operation system unit 11 from being transmitted to the display output interface 7, and at least the keyboard portion is acted as an input device of the external operation system unit 16. At this time, the keyboard apparatus is used as the input device of the external operation system unit 16, and this kind of operation mode is called a common input device operation mode of the keyboard apparatus.

However, when the external system interface 12 is connected to and thus communicates with the display output interface 7 based on an operation of the switch operation component 142, the internal operation system unit 11 may be still in operation. In this way, when based on the operation of the switch operation component 142, the system is switched back from an external operation system to an internal operation system, such that the video signal from the external operation system unit 16 or the internal operation system unit 11 may be displayed on the display device, that's to say, the external operation system unit 16 or the internal operation system unit 11 can realize a time-division share to the display device.

The keyboard apparatus further comprises an output interface; when the external system interface 12 is connected to and thus communicates with the display output interface 7 based on an operation of the switch operation component 142, the internal operation system unit 11 outputs a signal to the output interface. To be specific, the output interface comprises an audio output interface 9; when the external system interface is connected to and thus communicates with the display output interface 7 based on an operation of the switch operation component 142, the internal operation system unit 11 outputs an audio signal to the audio output interface 9. In this way, a compatible operation mode of the keyboard apparatus is realized. Different operation modes of the keyboard apparatus having the system switch device 14 comprise the above-mentioned compatible operation mode. In the compatible operation mode, the keyboard apparatus functions as a common input device, and the internal operation system unit 11 transmits signal to at least part of the external devices via the output interfaces. Such as, in the compatible operation mode, the external operation system unit 16 (such as the PC host) has a control right to the display device, while the keyboard apparatus may be worked as the common input device of the external operation system unit 16 (such as the PC host) and is capable of transmitting signal to at least part of the external devices at the same time, such as transmitting continuously an audio signal to headset via the audio output interface 9. Since the present disclosure may be provided with various external devices as required, the keyboard apparatus in the compatible operation mode may be customized to transmit signal to several given external devices.

Similarly, when the external system interface 12 is connected to and thus communicates with the display output interface 7 based on an operation of the switch operation component 142, the internal operation system unit 11 is adapted to exchange data with the external operation system unit 16.

In an embodiment, in the common input device operation mode or the compatible operation mode, the external operation system unit 16 (such as the PC host) transmits the video signal to the keyboard apparatus via the external system interface 12, and the keyboard apparatus sends the video signal transmitted from the external operation system unit 16 to the display device via the display output interface 7. When the keyboard apparatus is in the terminal operation mode, the keyboard apparatus transmits a signal to the external operation system unit 16 via the external system interface 12 so as to shield the video signal transmitted from the external operation system unit 16, and sends the video signal processed by the internal operation system unit 11 (may comprise CPU and GPU) to the display device via the display output interface 7, and thus the keyboard apparatus exclusively control the display device.

Alternatively, when the keyboard apparatus is in the terminal operation mode, the keyboard apparatus may receive the video signal transmitted from the external operation system unit 16 via the external system interface 12, and sends the video signal processed by the internal operation system unit 11 (may comprise CPU and GPU) together with the received video signal from the external operation system unit 16 to the display device via the display output interface 7, and the display device may display different video signals in sub-domains thereof. In this way, the keyboard apparatus shares the display device with the external operation system unit 16.

In an embodiment, there is another data transmission channel between the external operation system unit 16 and the display device. In the common input device operation mode or the compatible operation mode, the video signal is transmitted to the display device by the external operation system unit 16 via the data transmission channel between the external operation system unit 16 and the display device. The external system interface 12 is only in charge of transmitting data from the keyboard apparatus to the external operation system unit 16, and the keyboard apparatus doesn't send data to the display device via the display output interface 7. When the keyboard apparatus is in the terminal operation mode, through the external system interface 12, the keyboard apparatus prevents the external operation system unit 16 from transmitting video signal to the display device, but sends the video signal processed by the internal operation system unit 11 (may comprise CPU and GPU) to the display device via the display output interface 7, and thus the keyboard apparatus exclusively control the display device.

In the exemplary embodiment as shown in FIG. 3 and FIG. 4, the system switch device 14 further comprises a control input interface 6 adapted to be connected to a control input device 20; and based on the operation of the switch operation component 142, the control input interface 6 and the display output interface 7 communicate simultaneously with one of the internal system interface and the external system interface 12. Optionally, the control input interface 6 comprises a mouse input interface and/or a touch panel input interface. In this way, regardless of the internal operation system unit 11 or the external operation system unit 16 to be used, the same control input device 20, such as a mouse, may be used.

In an exemplary embodiment of the present disclosure, the switch operation component 142 may be a key on the keyboard assembly. An original key of the keyboard may be acted as the switch operation component, or a function key may be added so as to be worked as the switch operation component.

Thus, the present disclosure provides a keyboard apparatus having switchable modes, and the keyboard apparatus is preset with a portable terminal operation system and can easily switch between the portable terminal operation system and the desktop operation system, so as to solve the problems, such as the high price, high power consumption and complicated operation of the traditional desktop computer, and poor compatibility between the portable terminal operation system and the traditional desktop operation system.

By using the above-mentioned technical solutions, the user can freely configure the keyboard apparatus. When the user needs to focus on the personal computer affairs, the keyboard apparatus may be used as a common input device, and is operated in the common input device operation mode; and when the user needs to use a portable terminal, the keyboard apparatus may be used as a portable terminal, and is operated in the portable terminal operation mode; when both modes are needed simultaneously, the keyboard apparatus may be operated in the compatible operation mode, and may be used as a common input device as well as a portable terminal. It can be used flexibly and will reduce expense for the users. The keyboard apparatus according to the present disclosure brings about the benefits, such as low power consumption, environment-friendly product and easy operation.

A detailed operation mode of the keyboard apparatus having a system switch device according to the present disclosure will be explained exemplarily with reference to FIG. 4.

Step I, starting the keyboard apparatus. The start can be achieved by plugging in the keyboard apparatus and pressing a start key on the keyboard apparatus and the like.

Step II, detecting an operation system of the internal operation system unit 11 of the keyboard apparatus and normally starting the internal operation system. As above mentioned, the internal operation system may be built in the memory device, and also may be provided in the external storage device. The internal operation system may be Android operation system, IOS operation system, or Windows operation system or Tizen operation system, or other operation system. The internal operation system unit 11 may process the following steps:

1. the internal operation system unit 11 transmits a display signal and a control signal to the system switch device 14 via a HDMI-VGA signal converter 15;

2. the internal operation system unit 11 outputs a display signal to the display output interface 7;

3. the internal operation system unit 11 receives inputs from the control input interface 6;

4. the internal operation system unit 11 outputs an audio signal to the audio output interface 9;

5. the internal operation system unit 11 receives an audio signal from the microphone input interface 5;

6. the internal operation system unit 11 reads the external storage device read-write unit 10;

7. the internal operation system unit 11 amplifies a wireless signal from the internal operation system unit 11 through the wireless antenna 13.

Step III, operating the switch operation component 142, such as pressing a manual switch key or an infrared remote switch so as to convert the input and output signal from the internal operation system unit 11 currently connected to the system switch device 14 to the input and output signals from the external operation system unit 16 (such as the PC host), and may process the following steps now:

the internal operation system unit 11 stops outputting a display signal to the display output interface 7, and the internal operation system unit 11 stops receiving inputs from the control input interface band other external input devices;

the external operation system unit 16 receives control signal from the mouse or other external input devices via the control input interface 6;

the internal operation system unit 11 continues to output an audio signal to the audio output interface 9;

the internal operation system unit 11 continues to receive an audio signal from the microphone input interface 5.

Step IV, operating the switch operation component 142 again, the operation mode of the keyboard apparatus is changed to a portable terminal operation mode, that's to say, the internal operation system unit 11 runs and communicates with the display output interface 7, and the keyboard apparatus shields or prevents a video signal from the external operation system unit 16 from being transmitted to the display output interface 7.

It should be understood that various functions in above steps II, III are not necessary to be achieved in the above order, such as the audio signal from the microphone input interface 5 can be received first and the display signal is then output to the display output interface 7. The order can be varied based on the actual application and is not specifically limited.

In an exemplary embodiment of the present disclosure, the housing may at least partially cover the keyboard assembly.

The keyboard apparatus having a system switch device together with the display device may constitute a computer assembly. The computer assembly comprises the keyboard apparatus having the above system switch device; a PC host installed with the external operation system unit; and a display device communicating with the display output interface.

The embodiments disclosed above are just the preferred embodiments of the present invention; however, the present disclosure is not limited thereto. It would be appreciated by those skilled in the art that various changes or modifications may be made in these embodiments without departing from the principles and spirit of the disclosure, the scope of which is defined in the claims and their equivalents.

What is claimed is:

1. A keyboard apparatus having an operation system, comprising:
    a housing;
    a keyboard assembly having a keyboard portion for performing an input operation outside of the housing and formed in a form of personal computer keyboard;
    a circuit board provided within the housing;
    a display output interface connected to the circuit board;
    an internal operation system unit connected to the circuit board and adapted to communicate with the keyboard assembly and the display output interface; and
    a system switch device for communicating with the display output interface and having:
    an internal system interface adapted to communicate with the internal operation system unit and transmit a video signal to the display output interface;
    an external system interface adapted to communicate with an external operation system unit independent of the keyboard apparatus and transmit a video signal from the external operation system unit to the internal operation system unit; and
    a switch operation component,
    wherein the display output interface is configured to selectively communicate with the internal system interface and the external system interface selectively communicates with the display output interface based on an operation of the switch operation component; and
    when the internal system interface is connected to the display output interface, the internal operation system unit is adapted to receive or prevent the video signal from the external operation system unit via the external system interface.

2. The keyboard apparatus according to claim 1, wherein, when the internal system interface is connected to and thus communicates with the display output interface based on an operation of the switch operation component, the internal operation system unit runs and communicates with the display output interface via the internal system interface, and the keyboard apparatus shields or prevents a video signal from the external operation system unit from being transmitted to the display output interface, and an input device of the internal operation system unit comprises at least the keyboard portion.

3. The keyboard apparatus according to claim 2, wherein, the internal operation system unit is adapted to receive a data from the external operation system unit, and/or the external operation system unit is adapted to receive a data from the internal operation system unit.

4. The keyboard apparatus according to claim 1, wherein, the internal operation system unit is adapted to receive a video signal from the external operation system unit, and sends the received video signal from the external operation system unit and its own video signal to a display unit via the display output interface so as to display them in sub-domains of the display unit.

5. The keyboard apparatus according to claim 1, wherein, when the external system interface is connected to and thus communicates with the display output interface based on an operation of the switch operation component, and the keyboard apparatus shields or prevents a video signal from the internal operation system unit from being transmitted to the display output interface, and at least the keyboard portion is acted as an input device of the external operation system unit.

6. The keyboard apparatus according to claim 5, wherein, when the external system interface is connected to and thus communicates with the display output interface based on an operation of the switch operation component, the internal operation system unit is in operation.

7. The keyboard apparatus according to claim 6, wherein, the keyboard apparatus further comprises an output interface;
when the external system interface is connected to and thus communicates with the display output interface based on an operation of the switch operation component, the internal operation system unit outputs a signal to the output interface.

8. The keyboard apparatus according to claim 7, wherein, the output interface comprises an audio output interface;
when the external system interface is connected to and thus communicates with the display output interface based on an operation of the switch operation component, the internal operation system unit outputs an audio signal to the audio output interface.

9. The keyboard apparatus according to claim 6 wherein the internal operation system unit is adapted to receive a data from the external operation system unit, and/or the external operation system unit is adapted to receive a data from the internal operation system unit.

10. The keyboard apparatus according to claim 1, wherein, when the internal system interface is connected to and thus communicates with the display output interface based on an operation of the switch operation component, the internal operation system unit runs and communicates with the display output interface via the internal system interface, and the keyboard apparatus transmits a signal to the external operation system unit via the external system interface so as to prevent a video signal from the external operation system unit from being transmitted to the display output interface, and an input device of the internal operation system unit comprises at least the keyboard portion.

11. The keyboard apparatus according to claim 1, wherein,
the system switch device further comprises a control input interface adapted to be connected to a control input device; and
based on the operation of the switch operation component, the control input interface and the display output interface communicate simultaneously with one of the internal system interface and the external system interface.

12. The keyboard apparatus according to claim 11, wherein,
the control input interface comprises a mouse input interface and/or a touch panel input interface.

13. The keyboard apparatus according to claim 1, wherein,
the switch operation component is a key on the keyboard assembly.

14. The keyboard apparatus according to claim 1, further comprising:
one or more of an audio output interface, a microphone input interface, a power source input interface, a wireless antenna, a control input interface, a storage unit and an external storage device read-write unit, which are all connected to the circuit board.

15. The keyboard apparatus according to claim 14, wherein,
The control input interface comprises a mouse input interface and/or a touch panel input interface.

16. The keyboard apparatus according to claim 14, wherein,
The internal operation system unit is preset in an external storage device, and the external storage device is adapted to be read by the external storage device read-write unit.

17. The keyboard apparatus according to claim 1, wherein,
The internal operation system unit is installed with one of Android operation system, IOS operation system, Linux operation system and Tizen operation system.

18. A computer assembly, comprising:
a display device, and
the keyboard apparatus having an operation system according to claim 1, the display device communicating with the display output interface.

19. A computer assembly, comprising:
the keyboard apparatus having an operation system according to claim 1;
a PC host installed with the external operation system unit; and
a display device communicating with the display output interface.

* * * * *